No. 685,156. Patented Oct. 22, 1901.
P. M. LINCOLN & L. B. STILLWELL.
GOVERNOR MECHANISM.
(Application filed May 11, 1901.)

(No Model.) 2 Sheets—Sheet 1.

Witnesses
Franck L. Ormand.
Albert Popkins

Inventors.
Paul M. Lincoln
Lewis B. Stillwell
by Sturtevant & Truley
Attorneys.

No. 685,156. Patented Oct. 22, 1901.
P. M. LINCOLN & L. B. STILLWELL.
GOVERNOR MECHANISM.
(Application filed May 11, 1901.)
(No Model.) 2 Sheets—Sheet 2.

Witnesses
Franck L. Ourand.
Albert Popkins

Inventors
Paul M. Lincoln
Lewis B. Stillwell
by Sturtevant & Greeley
Attorneys.

UNITED STATES PATENT OFFICE.

PAUL M. LINCOLN, OF NIAGARA FALLS, AND LEWIS B. STILLWELL, OF NEW YORK, N. Y.

GOVERNOR MECHANISM.

SPECIFICATION forming part of Letters Patent No. 685,156, dated October 22, 1901.

Application filed May 11, 1901. Serial No. 59,802. (No model.)

*To all whom it may concern:*

Be it known that we, PAUL M. LINCOLN, residing at Niagara Falls, in the county of Niagara, and LEWIS B. STILLWELL, residing at New York, in the county of New York, State of New York, citizens of the United States, have invented certain new and useful Improvements in Governor Mechanism, of which the following is a description, reference being had to the accompanying drawings, and to the characters of reference marked thereon.

Our invention relates to controlling devices or governors for water-wheels or other prime movers, particularly those which are employed to drive electric generators; and the object of the invention is to provide a governing mechanism which will maintain such relative conditions of load and speed in the machinery driven by the prime mover as may be desired. It has been further designed to provide a governing system capable of regulating two or more electric generators driven by independent power units through automatically varying the power supplied thereto to correspond with changes in load and speed, maintaining at the same time those conditions of equilibrium which are essential to the practical operation of the machines in parallel. The invention is not, however, limited to the control of prime movers used to drive electric generators, but is applicable to many cases where machinery other than electrical is driven.

The invention is illustrated in the accompanying drawings, in which—

Figure 1:
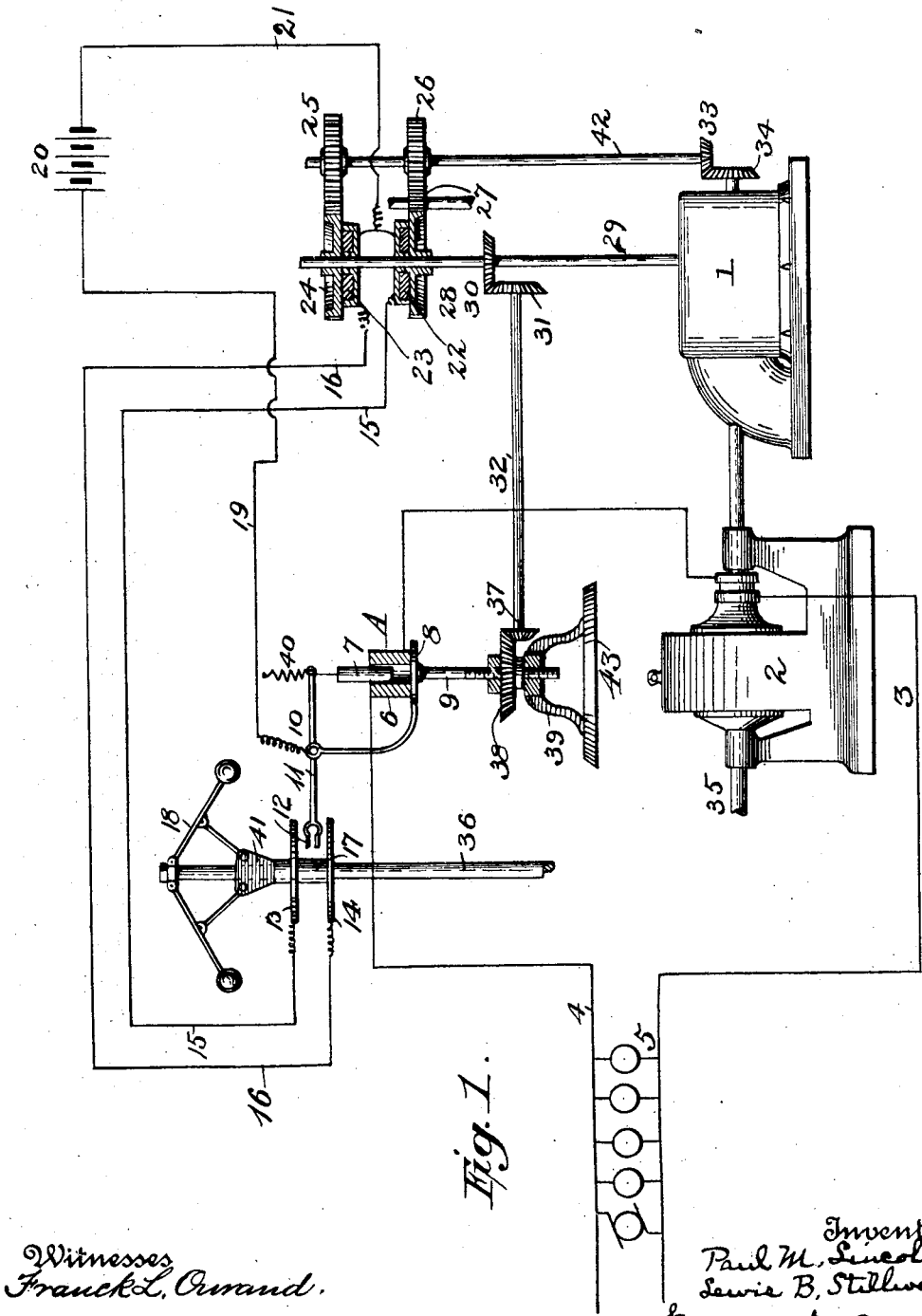
Figure 2:
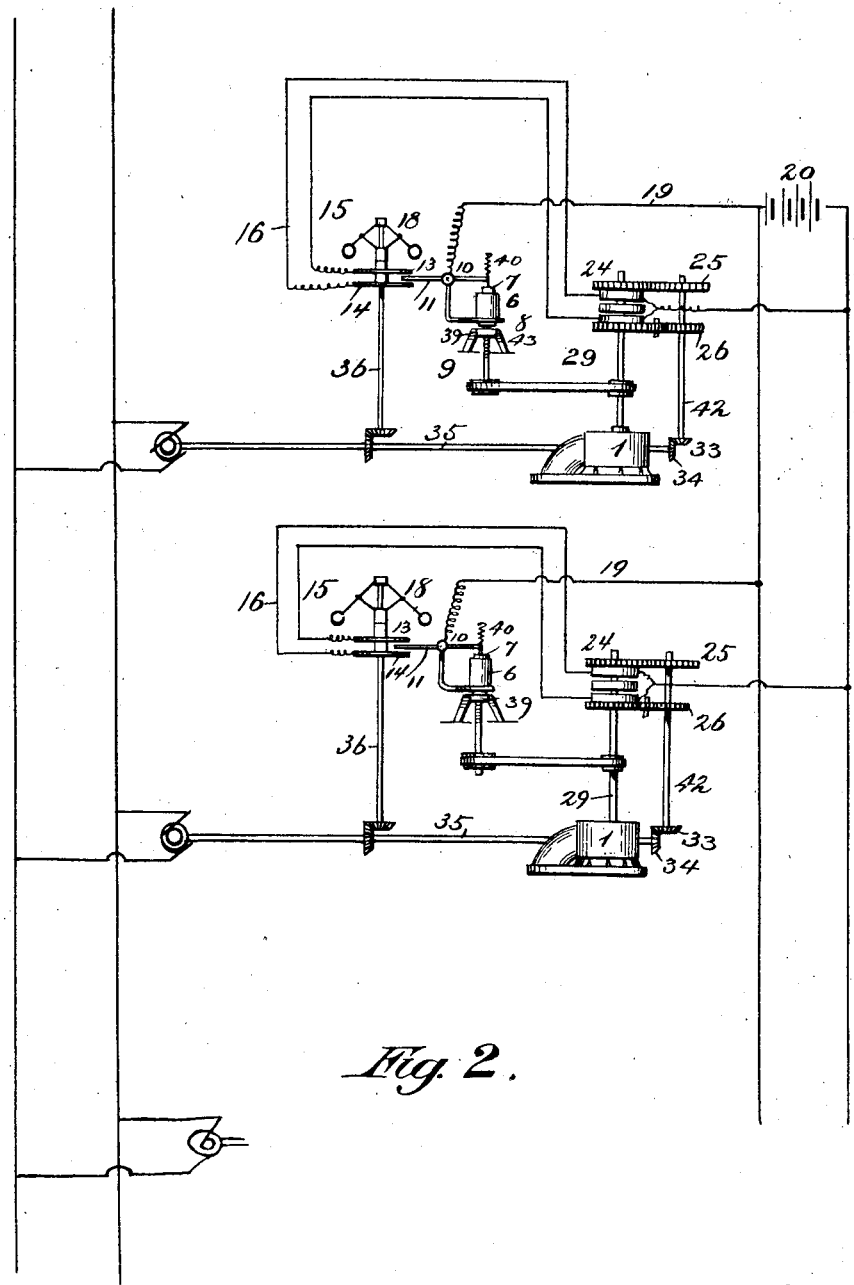

Figure 1 is a view showing diagrammatically the general arrangement of the parts of the apparatus when a single unit is to be governed, and Fig. 2 is a similar view illustrating the system applied to several units operating in parallel.

Referring particularly to Fig. 1, 1 is a turbine water-wheel or other source of power or prime mover which is arranged to drive the electric generator 2, supplying current through the circuit 3 4 to the translating devices 5. In the generator-circuit 4 is placed a load-responsive device A, which is here conventionally shown as an ammeter; but in actual practice a wattmeter or similar instrument would preferably be employed. When the load upon the prime mover consists of machiney other than electrical, some form of dynamometer introduced between the prime mover and the load could be employed, and such means might be desirable even in the case of electric generators. In any event it is only necessary that changes in load should produce some effect upon the control whether this is effected electrically or mechanically. This load-responsive device, as here shown, consists of a solenoid 6 and a core 7, the latter being attached to a lever-arm 11, pivoted at 10 and held in a normal position by some means, such as a spring 40. A contact-finger 12 is carried at the end of the lever 11, and its normal position is midway between the contact-disks 13 and 14, carried upon a sleeve 17, which is in turn mounted upon a shaft 36, the speed of which is to be governed. The shaft 36 would ordinarily derive its motion from the shaft 35 of the generator 2; but our invention need not necessarily be limited to such arrangement.

The sleeve 17 carries on its upper end or is attached to the weight 41, which is associated with the ball-governor 18 and adapted to be raised and lowered as the speed of the shaft 36 is increased or diminished. The disks 13 and 14 are so arranged that current may enter and leave them through the wires 15 and 16, while the contact 12 and lever 11 are connected to wire 19.

The valve-stem of the prime mover is represented at 29, a rotation of which in one direction increases the power supplied thereto and in the reverse direction diminishes the same.

22 and 23 are magnetic clutches keyed to the shaft or valve-stem 29. One terminal of the clutch 22 is connected to conductor 15 and disk 13, and one terminal of clutch 23 is connected to conductor 16 and disk 14. The opposite terminals of both clutches are connected to a common conductor 21, which leads to one terminal of a battery or other source of current, (represented at 20.) The other terminal of battery 20 is connected to contact 12 through the lever 11 and conductor 19. Either clutch 22 or 23 is adapted to frictionally engage the face of its corresponding gear 28 or 24 when excited.

Gears 28 and 24 are free to revolve upon the shaft 29 when out of frictional engagement with the clutch members and are constantly rotated in opposite directions, gear 24 being in mesh with gear 25 upon the shaft 42 and gear 28 with gear 26, also upon shaft 42, through the intermediate reversing-gear 27. Shaft 42 is continuously rotated by the prime mover 1 through the gears 33 and 34.

The load-responsive device A rests upon a supporting-standard 8, which is carried by the threaded rod 9, passing through the supporting-nut 39, which in turn is supported by the fixed base 43. A bevel-gear 38 is splined upon the rod 9 and engages with the gear 37 upon shaft 32, which through the gears 30 and 31 is given a movement proportional to the movement of the valve-stem 29. Any movement of the valve stem or rod thus causes a corresponding movement on the part of the gear 38 and a vertical movement of the rod 9 and the load-responsive device, together with contact 12. The movement of contact 12 will be upward or downward according as the valve-rod is moved to a position of lesser or greater power-supply.

The operation of the device is as follows: Assuming the speed to be constant and the disks 13 and 14 to remain in the position shown, any appreciable increase in load will cause the coil 6 to attract the core 7 and bring the contact 12 against the disk 13, thus exciting the magnetic clutch 22 and causing the valve-stem 29 to be revolved in the direction of rotation of the gear 24—viz., to a position of greater power-supply. The rotation of the valve-stem and the increase of power supplied to the prime mover will be continued until the downward movement of the load-responsive device communicated through the medium of the shaft 32 is sufficient to disengage the contact 12 from the disk 13. When this occurs, equilibrium will be restored. A decrease in load will cause contact between the finger 12 and disk 14 and a closing of the valve until the upward movement of the load-responsive device breaks the contact between 12 and 14. Since, however, the position of the disks 13 and 14 is dependent upon the speed of the shaft 36, the conditions under which equilibrium will be reached will depend on the relation between the movement of the contact 12 effected by the load-responsive device and that effected by the valve-rod. If the change in position of contact 12 effected by the load-responsive device is greater than its change in position as effected by the movement of the valve-rod corresponding to any given increment of load, then the speed of the shaft 36 will increase with an increase in load and diminish with a decrease in load. Thus when an increase in load causes contact between finger 12 and disk 13 and the excitation of clutch 22 the downward movement communicated to the load-responsive device when the valve has been opened to a position corresponding to the increase in load will not be sufficient to break the contact with disk 13. The valve will therefore continue to open, and with the surplus of power thus supplied the speed will increase until by the combined upward movement of the disk 13, caused by the ball-governor or speed-responsive device 18, and the downward movement of 12, caused by the additional opening of the valve, the circuit is opened and equilibrium restored at the increased load and speed. On the other hand, if the change in position of contact 12 effected by the load-responsive device is less than the change in position effected by the movement of the valve-rod corresponding to any given increment in load then the speed will decrease with an increase in load, and vice versa, for in the case of an increase, on account of the relation now supposed to exist, the movement of the valve will break the actuating-circuit at the contact 12 before it has been opened far enough to provide for a supply of power corresponding to the increment in load. A drop in the speed of the machines results from this insufficiency in power-supply, and the disk 13 follows the contact 12 downward, causing a further opening of the valve until a position of equilibrium is reached, where the increment in load can be maintained by the smaller increment in power-supply at the reduced speed. In a similar manner it is evident that a decrease in load under these circumstances will be followed by an increase in speed. If the change in position effected by the load-responsive device is equal to the change in position effected by the movement of the valve-rod corresponding to any given increment in load, then the speed will be independent of the load. This arrangement of controlling elements possesses marked advantages in governing alternators operating in parallel, and in Fig. 2 is shown such an application of our invention.

If the total motion of the contact 12 due to the load-responsive device between the limits of no load and full load is made equal to or greater than the total motion of the contact due to the valve-rod between the limits of full-open valve and closed valve, then there would ordinarily be unstable equilibrium in the combination, for it is impossible that the regulators of all the alternators should respond simultaneously and make the circuit controlling the valve-rod. One alternator will move to have its gate opened ahead of the others, and as a consequence will take more load than the others. Its load-responsive device will therefore cause its valve-controlling circuit to remain closed until the valve of its prime mover has been forced wide open. In the arrangement disclosed this may be prevented and the governing effected without any such uneven distribution of the load by any means which will cause a decreasing speed with an increasing load. This means might be either that above described—viz., making the vertical movement of the contact-finger caused by the movement of the valve-rod corresponding to any given increment of load greater than that caused by the load-responsive device, so that the contact will be broken before the valve reaches a position corresponding to the increased load—or the same end might be attained by causing the position of the disks 13 and 14 to be dependent upon the load as well as upon the speed, so that although the movement of the contact 12 occasioned by the valve-stem is less than that occasioned by the load-responsive device and in order of itself to break the contact the valve must be moved to a position beyond that necessary to take care of the increment in load, yet the simultaneous movement of the disks 13 and 14 tends to break the controlling-circuit on an increase of load before the valve has opened to the full amount corresponding to that load.

We desire it to be clearly understood that the instrumentalities shown in the drawings are largely illustrative; that for the speed-responsive device any actuating means, whether electrically or mechanically operated, sensitive to speed changes may be employed; that the ammeter shown is merely significant of any form of load-responsive device; that our invention in this particular feature broadly covers any means, either electrical or mechanical, for this purpose; that the mechanism for opening and closing the gates may be replaced by any other suitable mechanism, and that it is only necessary that the connections between the load-responsive device and the valve-rod should be such that the effect of the load-responsive device under changes in load be compensated for, or under or over compensated for, by the resulting movement of the valve-rod. It is also to be observed, as before stated, that this system of control is not limited to a load consisting of electric generators, but may be used for any form of load, electrical or mechanical, which the prime movers may be called upon to carry.

Having thus described our invention, what we claim as new, and desire to secure by Letters Patent, is—

1. The combination of a prime mover, means for controlling the power supplied thereto, and means actuating said latter means, under the influence of a speed-responsive device, a load-responsive device and the said power-supply-controlling means; substantially as described.

2. The combination of a prime mover, an electric generator driven thereby, a valve for said prime mover, means for actuating said valve, an electric circuit controlling said actuating means, a switch for said circuit, and means for controlling said switch, including a load-responsive device, a speed-responsive device and means associated with the valve.

3. The combination of a prime mover, an electric generator driven thereby, a valve for said prime mover, a load-responsive device adapted to cause a movement of said valve with changes in load, and means for causing said movement to cease before the valve position corresponding to such increased load has been reached; substantially as described.

4. The combination of a prime mover, a valve therefor, a speed-responsive device for actuating said valve, a load-responsive device also adapted to actuate said valve, and means operated by the valve for stopping such actuation when its proper movement has been effected; substantially as described.

5. The combination of a prime mover, a valve therefor, an electric generator, a speed-responsive device, and a load-responsive device, coöperatively controlling said valve, and means for stopping the movement of the valve, when it has reached a given position; substantially as described.

6. The combination of an electric generator, a controlling mechanism therefor, coöperatively actuated by a speed-responsive device and a load-responsive device, and means for automatically causing the stoppage of said mechanism when the proper control has been effected; substantially as described.

7. The combination of two or more prime movers, valve mechanisms therefor, electric generators driven thereby and connected in parallel, means for independently controlling such valve mechanisms through the coöperative influence of a speed-responsive device and a load-responsive device, and means associated with said valve mechanisms adapted to cause a decrease in speed with increase in load; substantially as described.

8. The combination of a prime mover, a valve therefor, and a controlling mechanism for the valve coöperatively actuated by a speed-responsive device, a load-responsive device and a device responsive to the valve movement; substantially as described.

9. The combination of two or more prime movers, independent power-supply mechanisms therefor, electric generators adapted to be driven thereby and connected in parallel, load-responsive devices adapted to increase or diminish the power-supply with changes in load and means for so limiting the effect of the load-responsive devices as to cause a decrease in speed with an increase in load.

10. The combination of two or more prime movers, independent power-supply mechanisms therefor, load-responsive devices for controlling said mechanisms and means for causing a decrease in speed with increase in load.

11. The combination of a prime mover, an electric generator driven thereby and means for under-compensating in the power-supply of the prime mover for an increase or decrease in load upon the generator.

12. The combination with a prime mover, of a dynamo-electric machine adapted to be driven thereby, a valve for the prime mover, a controlling element for said valve, a speed-responsive device adapted by its movement to bring said element into a position of control, a load-responsive device also adapted by its movement to bring said element into a position of control, and means to negative their effect on the controlling element by the movement of the valve; substantially as described.

13. The combination of a prime mover, a dynamo-electric machine driven thereby, means for controlling the power supplied to the prime mover, means actuating said latter means under the influence of a speed-responsive device and a load-responsive device, and connections between the power-supply-controlling means, and the actuating means whereby the effect of the latter is modified; substantially as described.

14. The combination of a prime mover, a dynamo-electric machine driven thereby, means for controlling the power supplied to the prime mover, a speed-responsive device and a load-responsive device actuating said controlling means and adapted to coöperate or oppose each other's action, and means associated with the valve to negative the action of either or both by the movement of the valve; substantially as described.

15. The combination of two or more prime movers, independent power-supply mechanisms therefor, dynamo-electric machines driven thereby and operating in parallel, and means for under-compensating in the power-supply of any prime mover for variations in speed or load; substantially as described.

In testimony whereof we affix our signatures in presence of two witnesses.

PAUL M. LINCOLN.
LEWIS B. STILLWELL.

Witnesses to the signature of P. M. Lincoln:
　PHILIP P. BARTON,
　H. G. SMITH.

Witnesses to signature of L. B. Stillwell:
　W. E. RUNDLE,
　CHAS. H. NIXON.